(12) United States Patent
Slater et al.

(10) Patent No.: US 8,358,899 B2
(45) Date of Patent: Jan. 22, 2013

(54) APPARATUS FOR MECHANICALLY SPLICING OPTIC FIBERS

(75) Inventors: Brett Hoe Slater, Mount Colah (AU); Brent David Allwood, Buttaba (AU); Bryce Nicholls, Green Point (AU)

(73) Assignee: ADC GmbH, Berlin (DE)

( * ) Notice: Subject to any disclaimer, the term of this patent is extended or adjusted under 35 U.S.C. 154(b) by 112 days.

(21) Appl. No.: 12/886,892

(22) Filed: Sep. 21, 2010

(65) Prior Publication Data
US 2011/0088434 A1    Apr. 21, 2011

(30) Foreign Application Priority Data
Oct. 21, 2009   (AU) ................................ 2009227906

(51) Int. Cl.
*G02B 6/00* (2006.01)
*G02B 6/255* (2006.01)
(52) U.S. Cl. .......................................... 385/135; 385/95
(58) Field of Classification Search .................. None
See application file for complete search history.

(56) References Cited

U.S. PATENT DOCUMENTS

| | | | |
|---|---|---|---|
| 5,857,045 A * | 1/1999 | Lee ................................. | 385/70 |
| 6,811,323 B2 | 11/2004 | Murray et al. | |
| 6,848,837 B2 | 2/2005 | Gilligan | |
| 7,014,372 B2 * | 3/2006 | Watte et al. ..................... | 385/98 |
| 7,481,585 B2 | 1/2009 | Scadden et al. | |
| 7,490,994 B2 | 2/2009 | Scadden et al. | |
| 7,530,746 B2 | 5/2009 | Kachmar | |
| 7,534,050 B2 | 5/2009 | Kachmar | |
| 7,766,556 B2 | 8/2010 | Kachmar | |
| 2003/0223712 A1 * | 12/2003 | Chapman et al. ............... | 385/96 |
| 2004/0057672 A1 * | 3/2004 | Doss et al. ..................... | 385/76 |
| 2009/0269011 A1 | 10/2009 | Scadden et al. | |
| 2010/0119197 A1 | 5/2010 | Scadden et al. | |
| 2011/0044590 A1 | 2/2011 | Kachmar | |

* cited by examiner

*Primary Examiner* — Tina Wong
(74) *Attorney, Agent, or Firm* — Merchant & Gould P.C.

(57) ABSTRACT

Apparatus for mechanically splicing two optic fibers, including an inner section including scoring apparatus, cleaving channels and a splicing channel; and two optic fiber restraining members, each being in operative communication with, and movable with respect to, the inner section; wherein restraining members locate end sections of optic fiber cores of said optic fibers in respective cleaving channels for scoring by said scoring apparatus; and wherein relative movement of the restraining members away from the inner section cleaves said end sections of optic fiber cores; and further relative movement between the restraining members and the inner section located cleaved end sections of said optic fiber cores into respective openings of the splicing channel to effect mechanical splicing therebetween.

23 Claims, 8 Drawing Sheets

APPARATUS FOR MECHANICALLY SPLICING OPTIC FIBERS

This application claims benefit of Serial No. 2009227906, filed 21 Oct. 2009 in Australia and which application is incorporated herein by reference. To the extent appropriate, a claim of priority is made to the above disclosed application.

TECHNICAL FIELD OF THE INVENTION

The present invention relates to a method and apparatus for mechanically splicing optic fibers.

BACKGROUND OF THE INVENTION

An optical connection between optic fibers can be effected by fusion or mechanical splicing. In general, fusion splicing involves joining two optic fibers end-to-end and effecting optical connection using heat and mechanical splicing involves holding two optic fibers in alignment so that light can pass from one to another.

The equipment used to effect fusion splicing is cumbersome and relatively expensive. Further the equipment may not be readily portable.

For mechanical splicing, fibers cores are either passively or actively aligned. Passive alignment relies on precision reference surfaces, generally grooves or cylindrical holes, to align fiber cores during splicing. Active alignment involves the use of light for accurate fiber alignment, and may consist of either monitoring the loss through the splice during splice alignment or by using a microscope to accurately align the fiber cores for splicing. To monitor loss, either an optical source and optical power meter or an optical time domain reflectometer (OTDR) are used.

In many circumstances, the above-described splicing methods either produce inaccurate results or take too long to precisely align optic fibers. Also, human error is prevalent in splicing operations performed in the field (i.e. splices made in cables mounted to telegraph poles) due to movement of the operator, time pressures, or simply due to the degree of accuracy required to ensure a precise splice.

In addition to the above mentioned difficulties with mechanical and fusion splicing, the ends of the optic fibers typically need to be cleaved before splicing is effected. A cleave is a deliberate, controlled break, intended to create a perfectly flat end face, perpendicular to the longitudinal axis of the fiber. A cleave is typically made by first introducing a microscopic fracture ("nick") into the fiber with a special tool which has a sharp blade of some hard material, such as diamond, sapphire, or tungsten carbide. If proper tension is applied to the fiber as the nick is made, or immediately afterward, then the fracture will propagate in a controlled fashion, creating the desired end face. The cleaving process involves the use of specialised equipment that is relatively expensive and may not be readily portable for a technician to take from job to job.

It is generally desirable to overcome or ameliorate one or more of the above mentioned difficulties, or at least provide a useful alternative.

SUMMARY OF THE INVENTION

In accordance with one aspect of the invention, there is provided an apparatus for mechanically splicing two optic fibers, including:
(a) an inner section including scoring apparatus, cleaving channels and a splicing channel; and
(b) two optic fiber restraining members, each being in operative communication with, and movable with respect to, the inner section;
wherein restraining members locate end sections of optic fiber cores of said optic fibers in respective cleaving channels for scoring by said scoring apparatus; and wherein relative movement of the restraining members away from the inner section cleaves said end sections of optic fiber cores; and further relative movement between the restraining members and the inner section locates cleaved end sections of said optic fiber cores into respective openings of the splicing channel to effect mechanical splicing therebetween.

Preferably, the scoring apparatus includes a scoring blade coupled to an externally depressible actuator for scoring said end sections of optic fiber cores seated in the cleaving channels.

Preferably, the restraining members are coupled to the inner section by shafts, and said relative movement and said further relative movement is effected as the restraining members move along and/or rotate about respective shafts.

Preferably, the restraining members are adapted to move along the shafts away from a cleaving position, where said end sections of optic fiber cores are arranged in cleaving channels, to an expanded cleaving position, where cleaved end sections of said optic fiber cores are removed from respective cleaving channels.

Preferably, the restraining members are adapted to rotate about the shafts to from said expanded cleaving position to an expanded splicing position where said cleaved end sections of said optic fiber cores are located for insertion into corresponding openings of the splicing channel.

Preferably, the restraining members are adapted to move along the shafts away from said expanded splicing position to insert said cleaved end sections of said optic fiber cores into corresponding openings of the splicing channel.

In accordance with another aspect of the invention, there is provided a method of mechanically splicing two optic fibers using the above described apparatus, including the steps of:
(a) inserting two optic fibers into respective restraining members;
(b) moving the restraining members relative to the inner section to a cleaving position where the end sections of optic fiber cores of optic fibers can be inserted into respective cleaving channels;
(c) inserting said end sections of optic fiber cores into respective cleaving channels;
(d) securing the optic fibers in fixed positions with respect to the restraining members;
(e) scoring the end sections of optic fiber cores;
(f) cleaving the end sections of optic fiber cores by moving the restraining members away from the inner section to an expanded cleaving position;
(g) moving the restraining members relative to the inner section from the expanded cleaving position to an expanded splicing position whereby cleaved end sections of said optic fiber cores can be inserted into respective openings of the splicing channel; and
(h) splicing said cleaved end sections of said optic fiber cores by moving the restraining members towards the inner section so that said cleaved end sections of said optic fiber cores are inserted into respective openings of the splicing channel.

Preferably, the method includes the steps of cleaving the end sections of optic fiber cores includes the step of pinching the inner section so as to tension the optic fiber cores as the restraining members move away from the inner section.

Preferably, the step of moving the restraining members relative to the inner section from the expanded cleaving position to the expanded splicing position includes the steps of rotating the restraining members with respect to the inner section to said expanded splicing position where said end sections of optic fiber cores are located for insertion into corresponding openings of the splicing channel.

Preferably, the method includes the step of securing the restraining members in fixed positions with respect to the inner section when the cleaved end sections of the optic fiber cores are inserted in the splicing channel.

In accordance with another embodiment of the invention, there is provided an apparatus for mechanically splicing two optic fibers having cleaved optic fiber cores, including:

(a) an inner section including a splicing channel for mechanically splicing end sections of said cleaved optic fiber cores; and
(b) two optic fiber restraining members, each being in operative communication with, and movable with respect to, the inner section;

wherein relative movement between the restraining members and the inner section forces end sections of cleaved optic fiber cores of optic fibers coupled to the restraining members into respective openings of the splicing channel to effect mechanical splicing therebetween.

Preferably, the restraining members are coupled to the inner section by shafts, said relative movement being effected as the restraining members move along respective shafts towards the inner section.

Preferably, the openings of the splicing channel are chamfered to guide the end sections of cleaved optic fiber cores into the channel.

Preferably, the splicing channel includes index matching gel.

In accordance with another aspect of the invention, there is provided a method of mechanically splicing two optic fibers having cleaved optic fiber cores using the above described apparatus, including the steps of:

(a) inserting two optic fibers into respective restraining members;
(b) securing the optic fibers in fixed positions with respect to the restraining members; and
(c) moving the restraining members relative to the inner section from an expanded splicing position whereby end sections of optic fiber cores can be inserted into respective openings of the splicing channel towards the inner section so that said end sections of optic fiber cores are inserted into respective openings of the splicing channel.

Preferably, the method includes the step of securing the restraining members in fixed splicing positions when the end sections of the optic fiber cores are inserted in the splicing channel.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS

Figure 8:
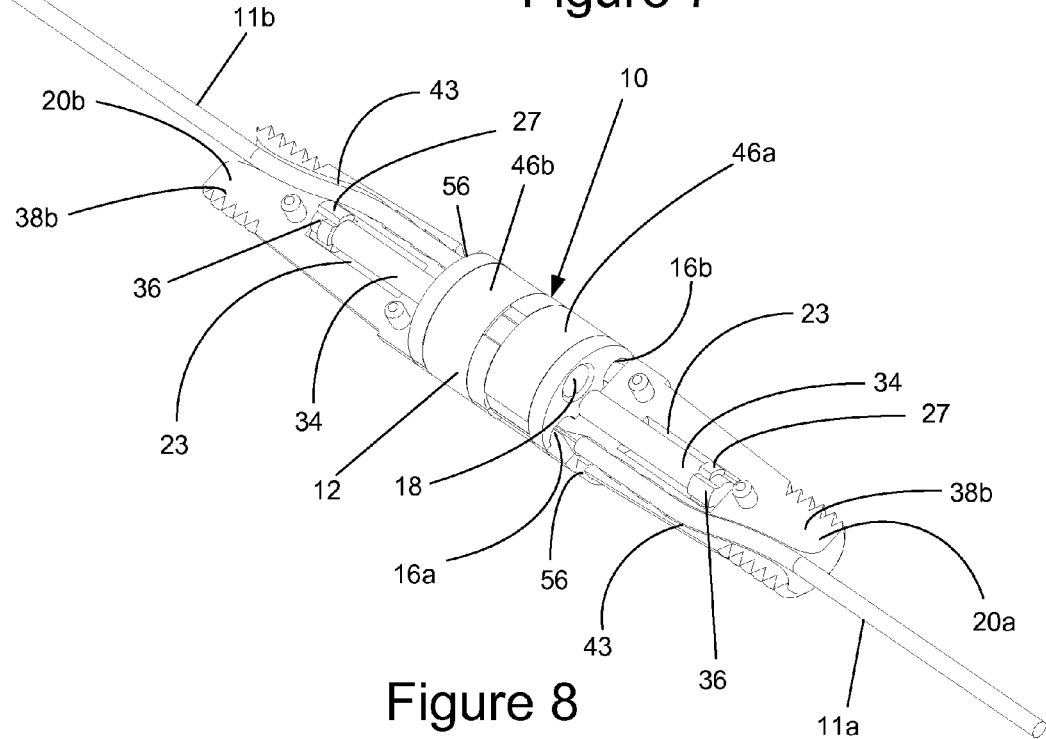
FIG. 8 is a perspective view of the apparatus shown in FIG. 1 coupled to two optic fibers with some parts removed.
Figure 9:
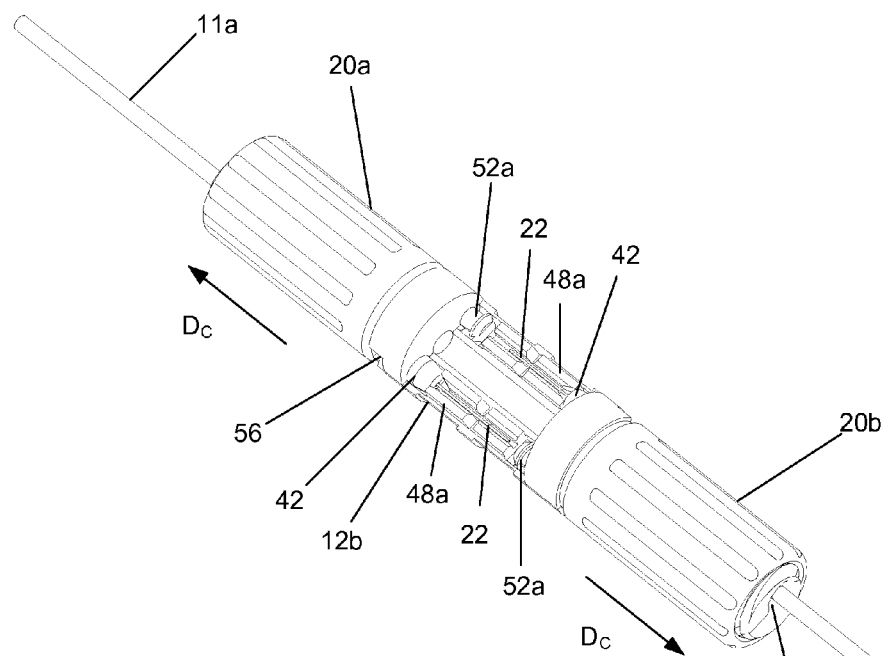
FIG. 9 is another perspective view of the apparatus shown in FIG. 1 coupled to two optic fibers with different parts removed.
Figure 10:
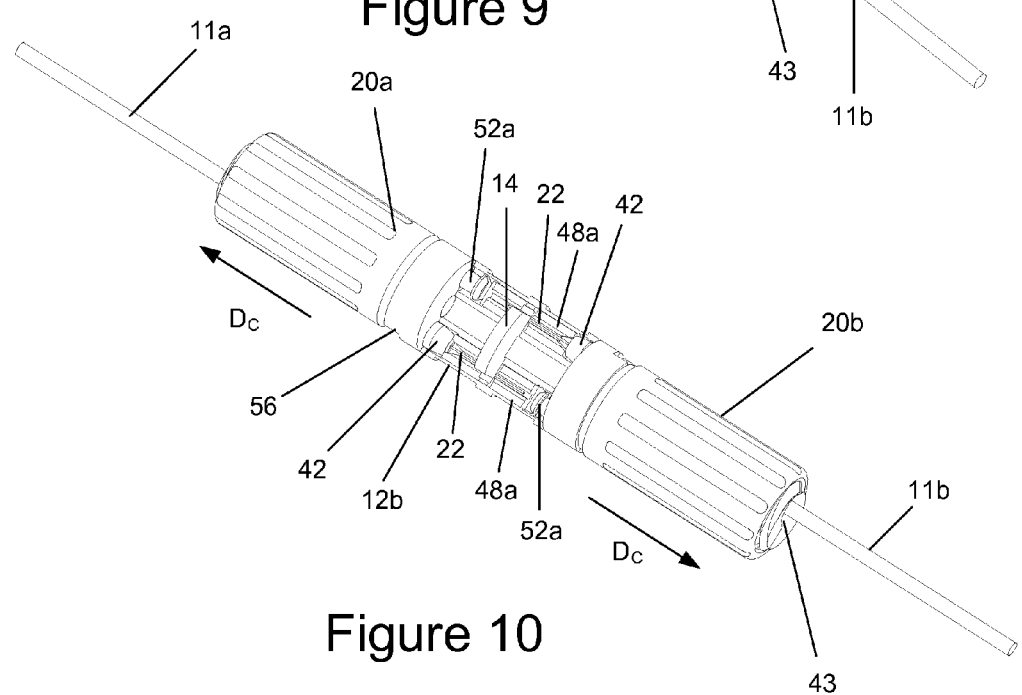
FIG. 10 is another perspective view of the apparatus shown in FIG. 1 coupled to two optic fibers with further different parts removed.

The apparatus 10 shown in FIGS. 1 to 16 is used to mechanically splice two optic fibers 11a, 11b. The apparatus 10 includes an inner section 12 including scoring apparatus 14, cleaving channels 16a, 16b and a splicing channel 18. As particularly shown in FIGS. 3 and 4, the apparatus 10 also includes two optic fiber restraining members 20a, 20b, each being in operative communication with, and movable with respect to, the inner section 12. The restraining members 20a, 20b are used to locate end sections 22 of optic fiber cores 24 of the optic fibers 11a, 11b in respective cleaving channels 16a, 16b for scoring by the scoring apparatus 14, as shown in FIGS. 9 and 10. Relative movement of the restraining members 20a, 20b away from the inner section 12 in direction $D_C$ cleaves the end sections 22 of optic fiber cores 24. Further relative movement between the restraining members 20a, 20b and the inner section 12 in directions $D_R$ and $D_S$ locates cleaved end sections 26 of the optic fiber cores 24 in respective openings 28 of the splicing channel 18 to effect mechanical splicing therebetween. The apparatus 10 can be used to quickly and easily cleave and mechanically splice two optic fibers. These two processes are effected simply and easily using the one apparatus 10.

The scoring apparatus 14 includes a scoring blade (not shown) coupled to an externally depressible actuator 30 for scoring the end sections 22 of optic fiber cores 24 seated in the cleaving channels 16a, 16b. The depressible actuator 30 translates along a slot 32 between retracted and extended conditions of use. The apparatus 14 preferably includes a spring to resiliently hold the actuator 30 in a retracted condition of use. The scoring blade is preferably formed in two parts, each part being operatively located over a cleaving channel 16a, 16b so as to engage and score ends 22 of optic fiber cores 24 located therein when the actuator 30 is arranged in a closed condition of use. The blade is preferably made of a hard material such as diamond, sapphire, or tungsten carbide.

Figure 11:
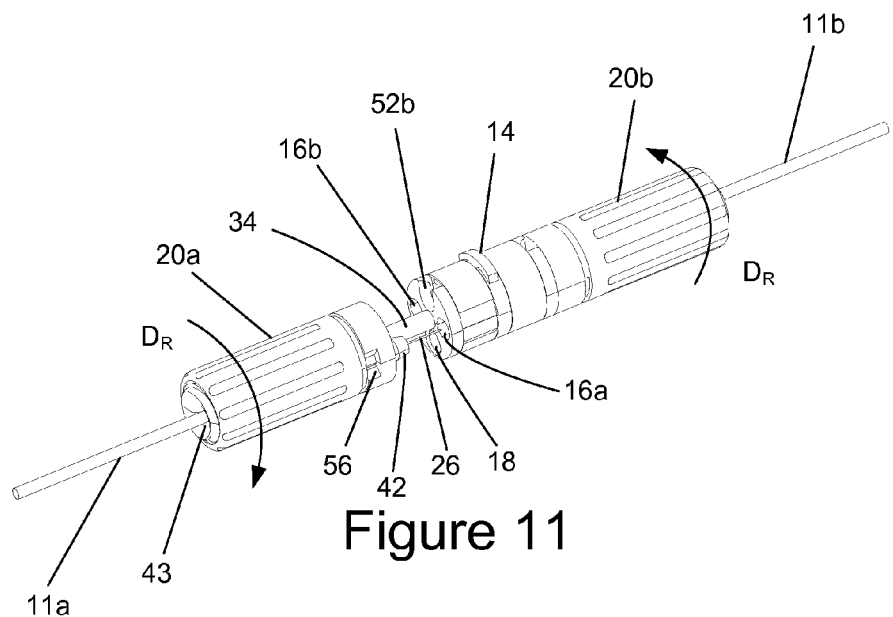
FIG. 11 is a perspective view of the apparatus shown in FIG. 1 coupled to two optic fibers and arranged in another condition of use.
Figure 12:
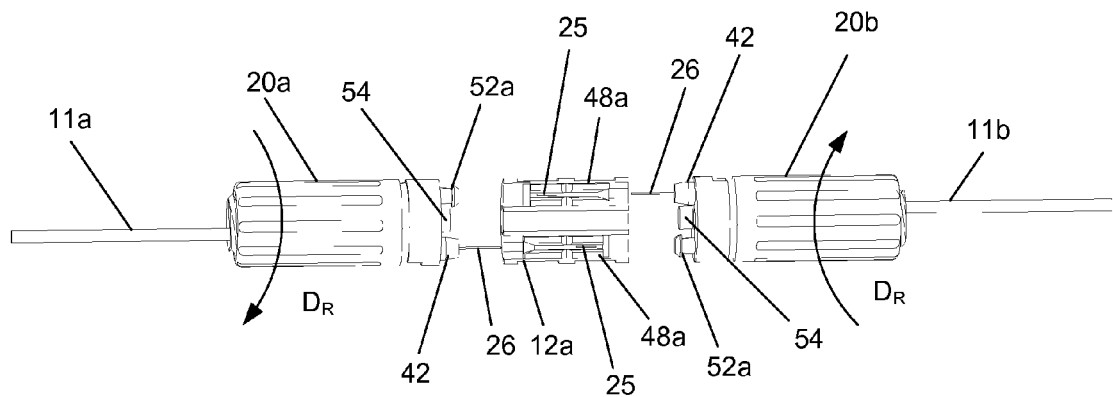
FIG. 12 is a perspective view of the apparatus shown in FIG. 11 with some parts removed.
Figure 13:
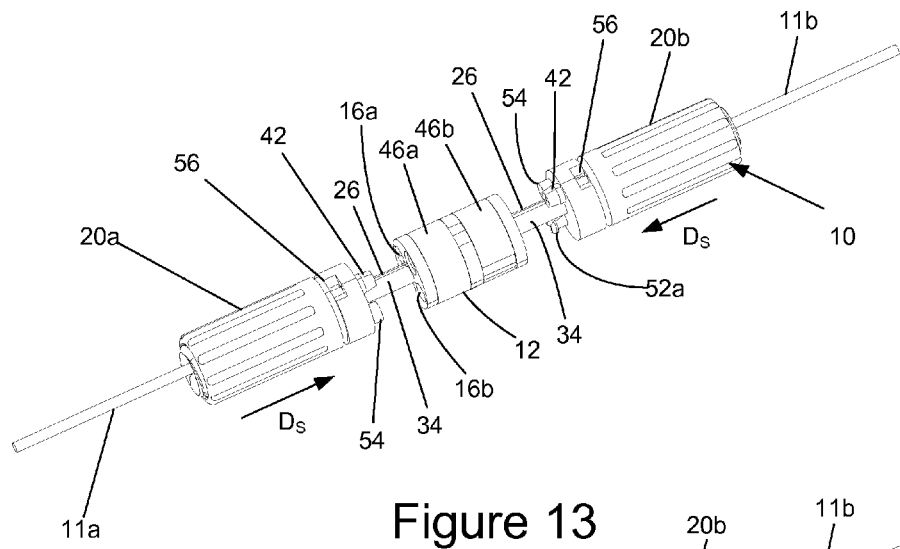
FIG. 13 is a perspective view of the apparatus shown in FIG. 1 coupled to two optic fibers and arranged in yet another condition of use.
Figure 14:
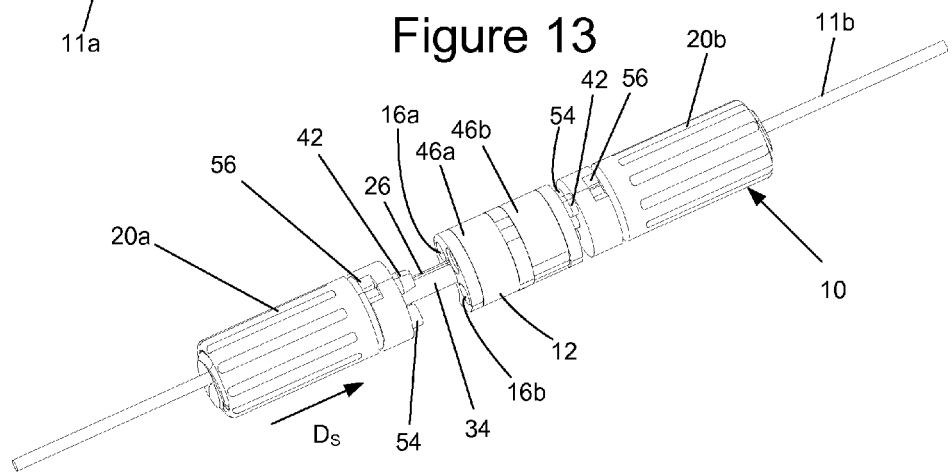
FIG. 14 is a perspective view of the apparatus shown in FIG. 13 arranged in another condition of use.
Figure 15:
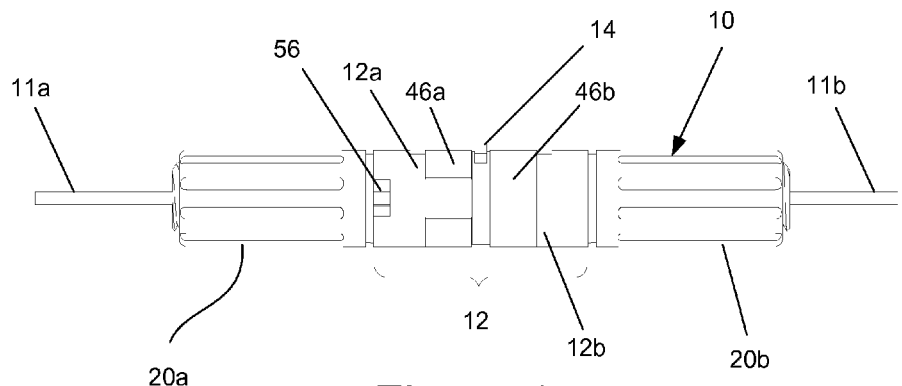
FIG. 15 is a perspective view of the apparatus shown in FIG. 13 arranged in yet another condition of use.

The restraining members 20a, 20b are coupled to the inner section 12 by shafts 34 extending therebetween. The restraining members 20a, 20b include slots 23 shaped to translate along and/or about the shafts 34 so as to move away from a cleaving position, where the end sections 22 of optic fiber cores 24 are arranged in cleaving channels 16a, 16b, as shown in FIGS. 8 and 9, in direction $D_C$ to an expanded cleaving position, where cleaved end sections 26 of the optic fiber cores 24 are removed from respective cleaving channels 16a, 16b, as shown in FIGS. 11 and 12. The restraining members 20a, 20b are adapted to rotate about the shafts 34 in direction $D_R$ from the expanded cleaving position to an expanded splicing position where the cleaved end sections 26 of the optic fiber cores 24 are located for insertion into corresponding openings 28 of the splicing channel 18, as shown in FIG. 13. The restraining members 20a, 20b translate along the shafts 34 in direction $D_S$ away from the expanded splicing position to insert the cleaved end sections 26 of the optic fiber cores 24 into corresponding openings 28 of the splicing channel 18, as shown in FIG. 14.

The range of movement of the restraining members 20a, 20b with respect to the inner section 12 is controlled by the keyed ends 36 of the shafts 34. The slots 23 are provided with wards (not shown) which abut teeth 27 of the keyed ends 36 of the shafts 34 and only allow the restraining members 20a, 20b to be rotated in direction $D_R$ through a limited range of movement. Once the teeth 27 abut corresponding faces of the wards, the respective restraining members 20a, 20b will either be in the expanded cleaving or splicing positions. Some of the teeth 27 may also be used to prevent removal of the keyed shaft 34 from the slots 23 of the restraining members 20a, 20b, by being received behind a discrete constriction in the slot 23 (i.e. a narrowing of the slot such that, once urged thereinto, the keyed shaft 34 is difficult to remove).

Figure 1:
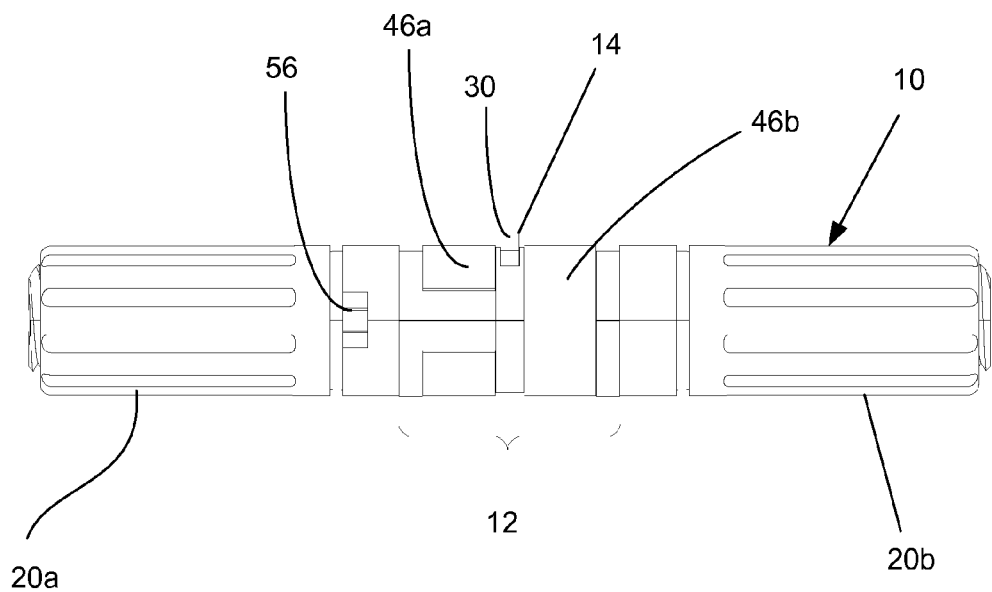
FIGS. 1 and 2 respectively show side and perspective views of apparatus for mechanically splicing two optic fibers.
Figure 2:
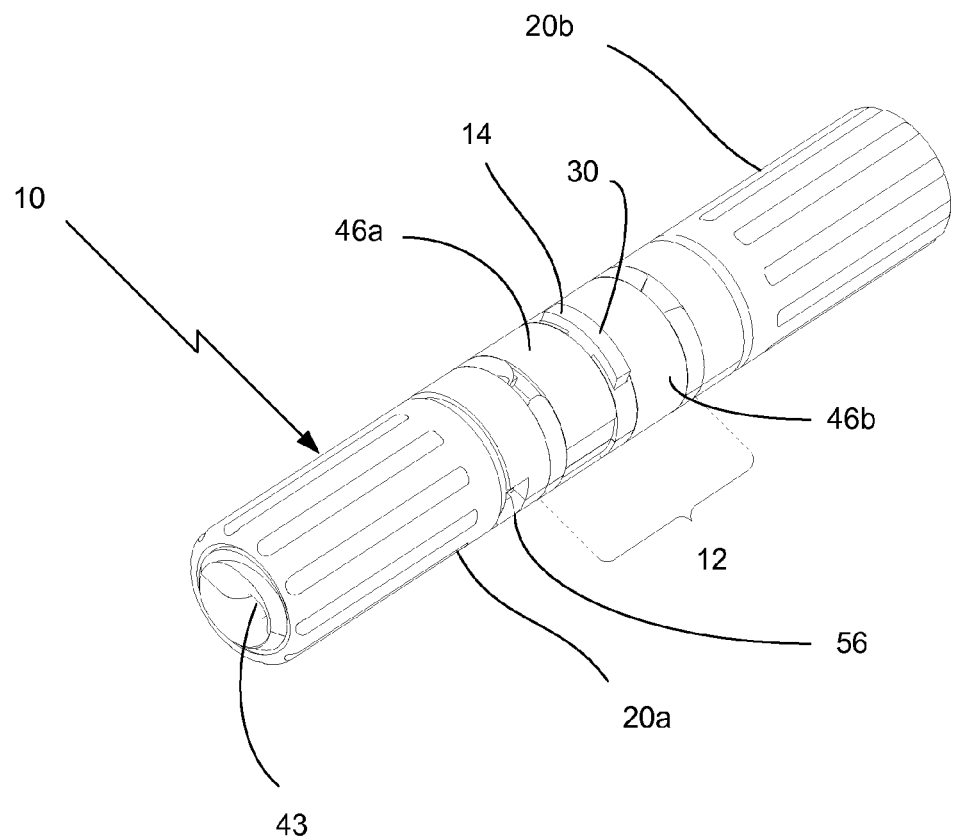
Figure 3:
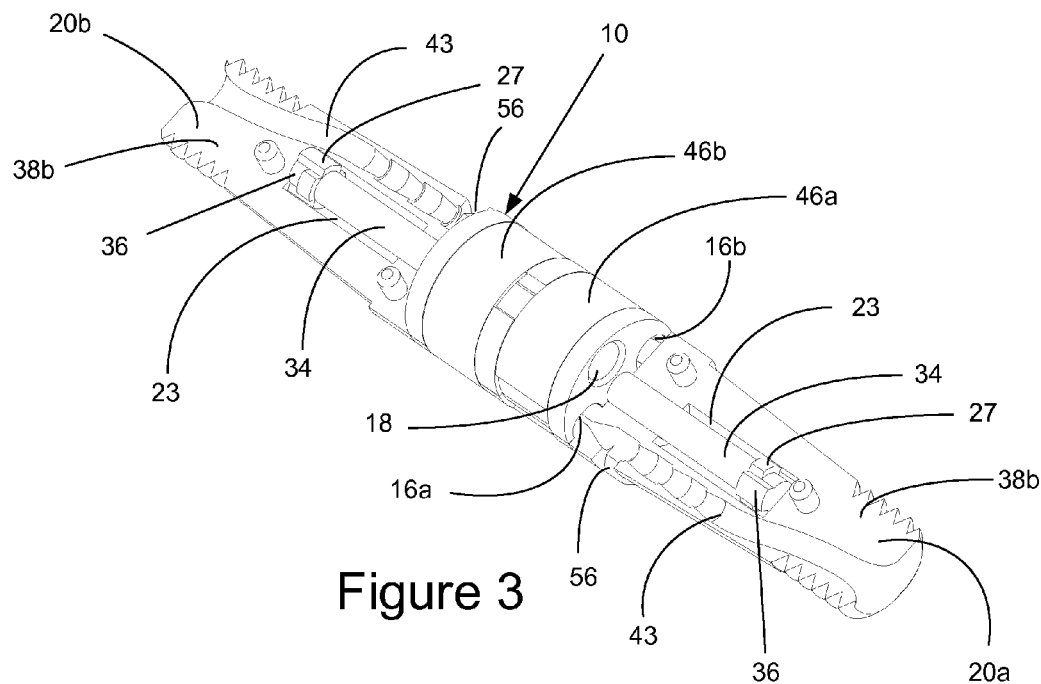
FIG. 3 is a perspective view of the apparatus shown in FIG. 1 with some of the parts removed.
Figure 4:
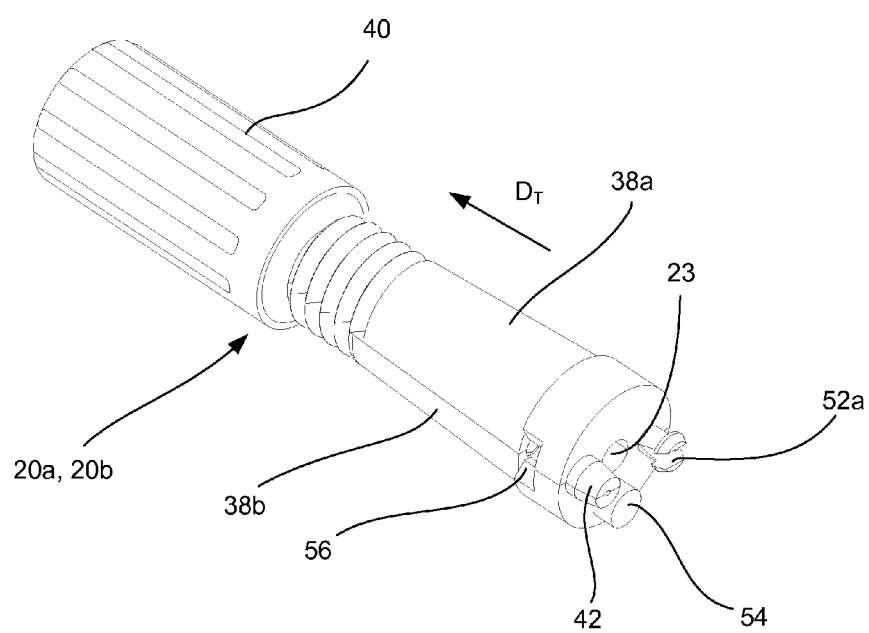
FIG. 4 is a partially exploded perspective view of a restraining member of the apparatus shown in FIG. 1.

As particularly shown in FIGS. 3 and 4, the restraining members 20a, 20b each include an optic fiber holding part 38 and a locking part 40 movable relative to each other between the optic fiber receiving position shown in FIG. 4 and the optic fiber securing position shown in FIG. 1. The optic fiber holding part 38 is formed in two separable parts 38a, 38b shaped fit around lateral end section of optic fiber 11a, 11b when arranged in the optic fiber receiving position. The parts 38a, 38b combine to define a slot 43 shaped to receive an end section of an optic fiber 11a, 11b in the manner shown in FIG. 8. The slots 43 of each restraining member 200a, 20b locate end sections 22 of optic fiber cores 24 of optic fibers 11a, 11b inserted therein in positions for engagement with the openings 44 cleaving channels 16a, 16b or the openings 28 of the splicing channel 18.

The locking part 40 of each one of restraining members 20a, 20b couples the two separable parts 38a, 38b of the optic fiber holding part 38 together when arranged in the optic fiber securing position. The locking part 40 is preferably a sleeve with a tapered screw thread shaped to screw over a corresponding tapered screw thread of the optic fiber holding part 38. Movement of the locking part in a direction of taper $D_T$ facilitates at least partial separation of the parts 38a, 38b of the optic fiber holding part 38 thereby allowing for insertion of an optic fiber 11a, 11b therebetween. Movement of the locking part 40 in an opposite direction constricts the parts 38a, 38b, thereby inhibiting removal of an optic fiber 11a, 11b arranged therebetween.

The optic fiber holding parts 38 also include a viewing window 56 through which the casing, insulation or secondary buffer of an optic fiber, can be viewed to ensure the fiber 11a, 11b has been properly inserted.

The restraining members 20a, 20b include projections 42 through which the end sections 22 of optic fiber cores 24 extend. Openings 44 of the cleaving channels 16a, 16b are shaped to at least partially receive corresponding projections 42 when the restraining members 20a, 20b are arranged in the cleaving position abutting the inner section 12. The projections 42 are tapered to assist in guidance into corresponding openings 44 of the cleaving channels 16a, 16b. As particularly shown in FIGS. 5 and 6, the inner section 12 is formed in two parts 12a, 12b which at least partially resiliently separate as the tapered projections enter the openings 44 of the cleaving channels 16a, 16b. The parts 12a, 12b combine to define male and female sections 48a, 48b of cleaving channels 16a, 16b which at least partially resiliently separate as the tapered projections of the restraining members 20a, 20b enter the openings 44 of the cleaving channels 16a, 16b. In doing so, the male and female sections 48a, 48b of the cleaving channels 16a, 16b are open to receive the end sections 22 of the optic fiber cores 24. The parts 12a, 12b of the inner section 12 are preferably resiliently coupled together by fasteners 46a, 46b. The fasteners 46a, 46b preferably include two resiliently expandable metal bands shaped to fit around the parts 12a, 12b of the inner section 12.

During a cleaving action, described below in further detail, the restraining members 20a, 20b move from the cleaving position in direction $D_C$, where the tapered projections 42 are seated in openings 44 of corresponding channels, to towards the expanded cleaving positions shown in FIG. 12. In doing so, the tapered projections 42 withdraw from the openings 44 and the fasteners 46a, 46b resiliently act to close the channels 16a, 16b thereby engaging and tensioning the end sections 22 of the optic fiber cores 24 as they retreat from the channels 16a, 16b. This tension causes the fracture formed by the scoring apparatus 14 on the end sections 22 of the optic fiber cores 24 to propagate in a controlled fashion creating the desired cleaved end face. That is, a flat end face that is perpendicular to the longitudinal axis of the fiber 11a, 11b.

Excess cleaved parts 25 of the end sections 22 of optic fiber cores 24 are retained in the cleaving channels 16a, 16b after the cleaving action is effected. The cleaving channels 16a, 16b include barriers 50 defining a furthest point of insertion of said end sections 22 of optic fiber cores 24.

Figure 5:
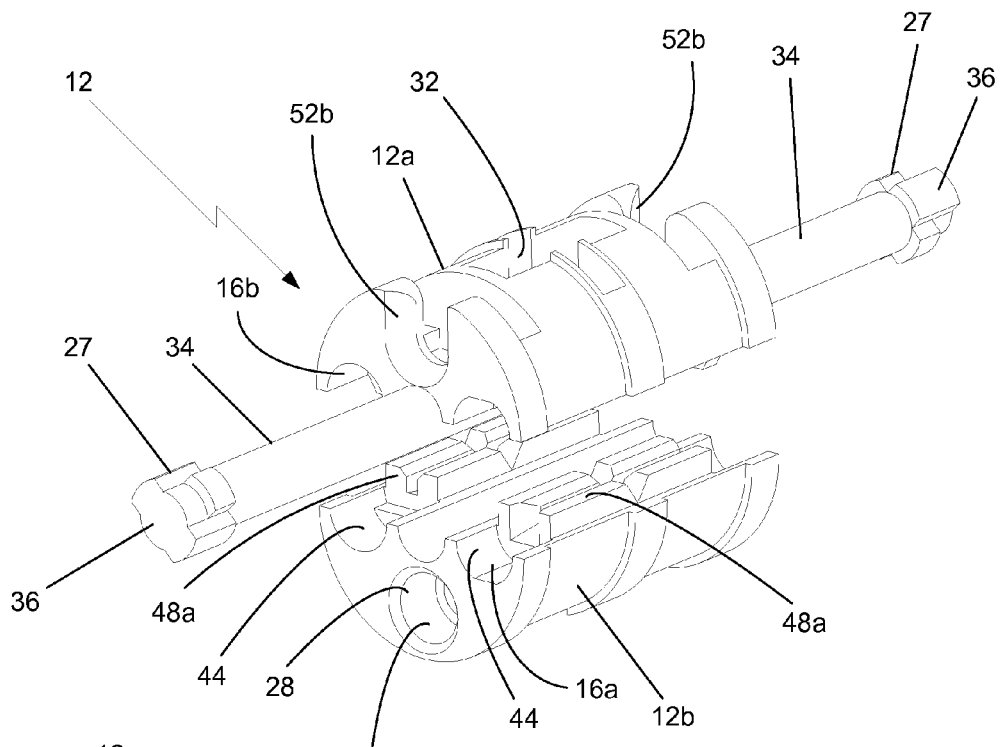
FIGS. 5 and 6 show partially exploded perspective views of an inner section of the apparatus shown in FIG. 1.
Figure 6:
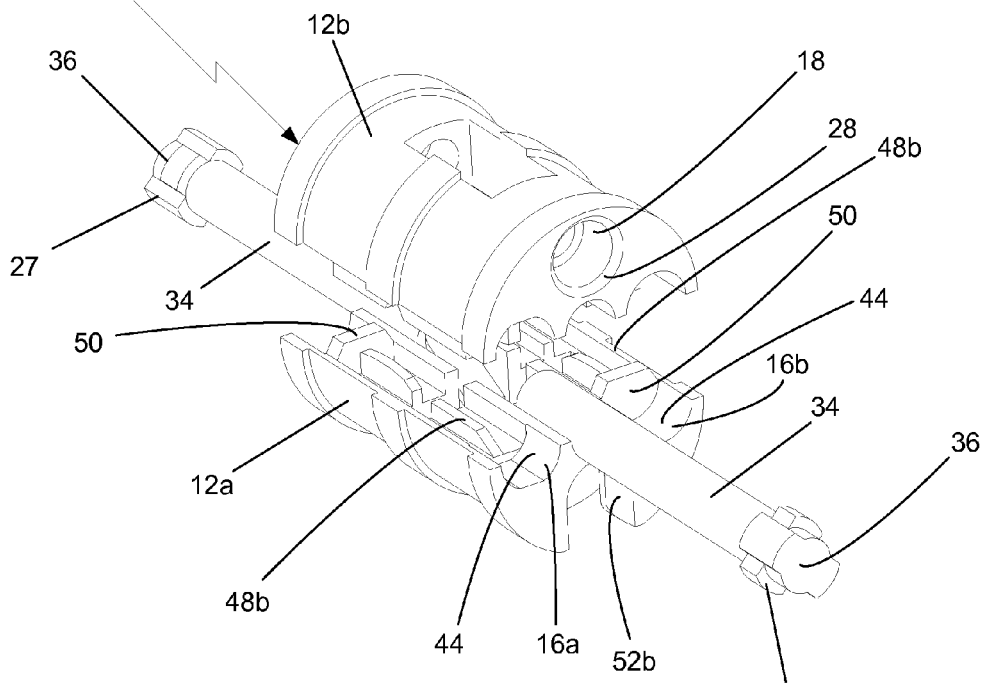
Figure 7:
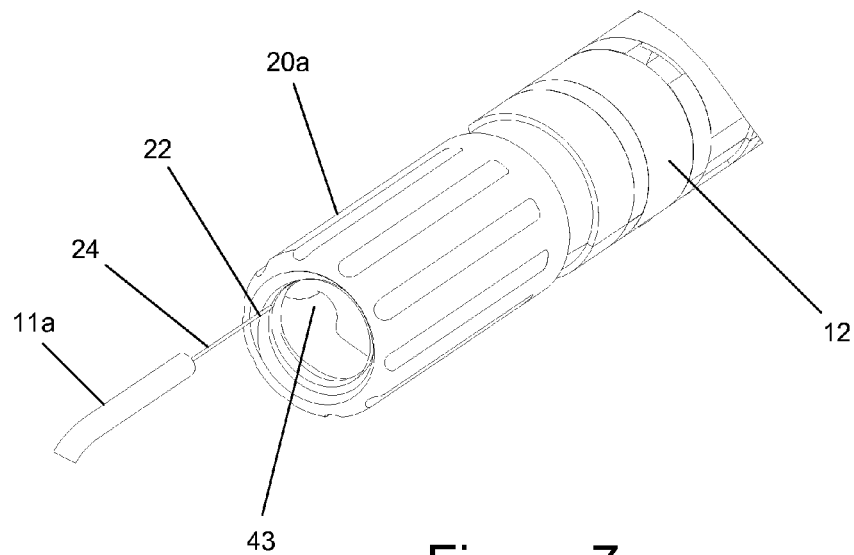
FIG. 7 is a perspective view of an end section of the apparatus shown in FIG. 1 being coupled to an optic fiber.

As particularly shown in FIGS. 5 and 6, the openings 28 of the splicing channel 18 are chamfered to guide the cleaved end sections 26 of the optic fiber cores 24 into the splicing channel 18. The splicing channel 18 preferably includes index matching gel.

Figure 16:
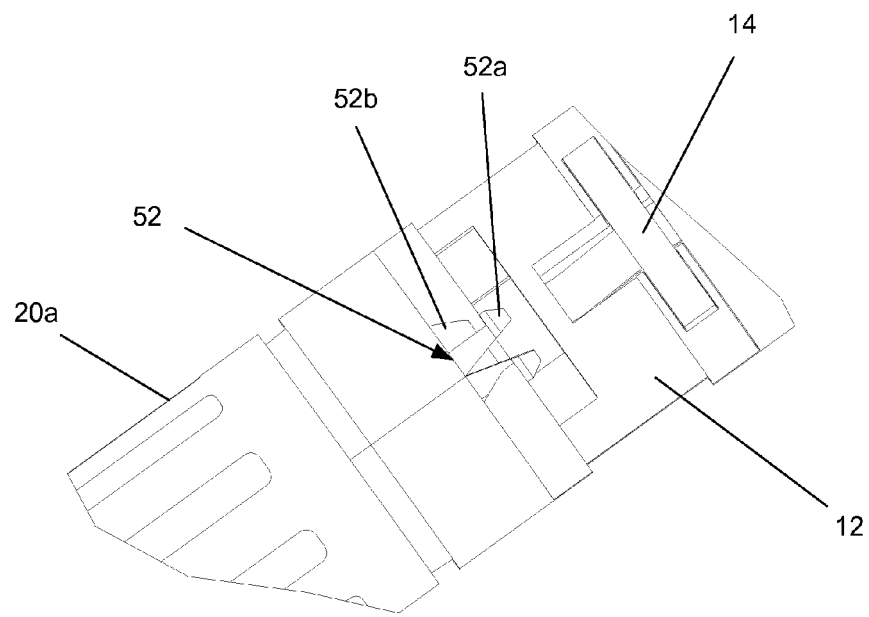
FIG. 16 is a close up view of a part of the apparatus shown in FIG. 15.

As particularly shown in FIG. 16, the apparatus includes fasteners 52 for coupling the restraining members 20a, 20b to the inner section 12 in fixed splicing positions where the cleaved end sections 26 of the optic fiber cores 24 are located in the splicing channel 18. The fasteners 52 include male barbed projections 52a extending from respective restraining members 20a, 20b and corresponding female clipping slots 52b formed in the inner section 12.

The openings 44 of the cleaving channels 16a, 16b are recessed and are shaped to at least partially receive corresponding locating projections 54 extending from respective restraining members 20a, 20b when the cleaved end sections 26 of the optic fiber cores 24 are inserted in the splicing channel 18 and mechanical splicing has been effected. The locating projections 54 inhibit movement of the restraining members 20a, 20b with respect to the inner section 12.

A technician can use the apparatus 10 to mechanically splice two optic fibers 11a, 11b by performing the following steps:

(a) stripping off outer sheath of ends of the optic fibers 11a, 11b;
(b) arranging the restraining members 20a, 20b in the optic fiber receiving position;
(c) inserting ends of the two optic fibers 11a, 11b into respective restraining members 20a, 20b;
(d) moving the restraining members 20a, 20b relative to the inner section 12 to the cleaving position where the tapered projections 42 engage and resiliently open the cleaving channels 16a, 16b;
(e) inserting end sections 22 of optic fiber cores 24 of the optic fibers 11a, 11b into respective cleaving channels;
(f) arranging the restraining members 20a, 20b in optic fiber securing positions;
(g) scoring the end sections 22 of optic fiber cores 24 using the scoring apparatus 14;
(h) cleaving the end sections 22 of optic fiber cores 24 by moving the restraining members 20a, 20b away from the inner section 12 in direction $D_C$ to the expanded cleaving position;
(i) rotating the restraining members 20a, 20b relative to the inner section 12 in direction $D_R$ to the expanded splicing position where the cleaved end sections 26 of the optic fiber cores 24 are located for insertion into corresponding openings 28 of the splicing channel 18;
(j) splicing the cleaved end sections 26 of said optic fiber cores 24 by moving the restraining members 20a, 20b in direction $D_S$ towards the inner section 12 so that the cleaved end sections 26 of the optic fiber cores 24 are inserted into respective openings 28 of the splicing channel 18; and
(k) securing the restraining members 20a, 20b in fixed splicing positions with respect to the inner section 12 with fasteners 52.

For step (k), the barbed male parts 52a of the fasteners 52 will enter the female clipping parts 52b. The female clipping parts 52b are narrower than the outermost diameter of the barbed male parts 52a, as such, the barbs will draw towards each other until they pass the respective lips of the female clipping parts 52b. At this time, the barbs will move back to their original position and thereby be received behind the lips. This will positively lock and hold the restraining members 11a, 11b relative to the inner section 12 to ensure the splice remains intact.

The step of cleaving the end sections 22 of optic fiber cores 24 preferably includes the step of pinching the inner section 12 so as to further tension the optic fiber cores 22 as the restraining members 20a, 20b move away from the inner section 12.

To ensure the end sections 22 of the cores 24 of optic fibers 11a, 11b are available for splicing, it is generally prudent to strip part of the acrylate primary coating and secondary buffer, or other form of insulation, from the optic fibers 11a, 11b. For an optic fiber 11a, 11b having a 125 mm core diameter, the length of exposed core required will preferably be around 7.5 mm.

The operator will be provided with two indications that the fibers 11a, 11b have been properly inserted. The first indication is that the cores 24 and/or coatings of the fibers 11a, 11b will be visible through the viewing windows 56, and the second indication will be experienced on the fibers 11a, 11b themselves, when they come into contact with the abutments 50 and are thereby prevented from further insertion.

Final adjustments to the extension of the fibers 11a, 11b into the openings 28 of the splicing channel 18 can be made by rotating the sleeves 40 of the restraining members 20a, 20b towards the optic fiber receiving position, thereby releasing the clamp on the fibers 11a, 11b and allowing them to be inserted further, or slightly withdrawn from the channel 18.

Figure 17:
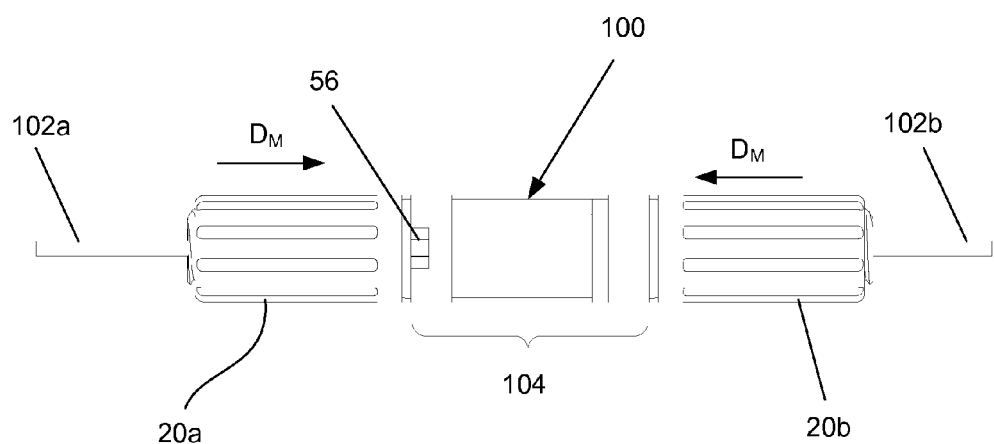
FIG. 17 is a side view of an apparatus for mechanically splicing two cleaved optic fibers.

The apparatus 100 shown in FIG. 17 is used to mechanically splice two optic fibers 102a, 102b having cleaved optic fiber cores (not shown). The apparatus 100 could also be used to splice optic fibers where the cores have not been cleaved or are not in need of cleaving. The apparatus includes many of the features of the apparatus 10 and like parts have been referenced with like reference numerals.

The apparatus 100 includes an inner section 104 including a splicing channel 18 for mechanically splicing end sections of the cleaved optic fiber cores; and two optic fiber restraining members 20a, 20b, each being in operative communication with, and movable with respect to, the inner section 104. Relative movement in direction $D_M$ between the restraining members 20a, 20b and the inner section 104 forces end sections of cleaved optic fiber cores of optic fibers coupled to the restraining members 20a, 20b into respective openings 28 of the splicing channel 18 to effect mechanical splicing therebetween. The apparatus 100 can thereby be used to quickly and easily mechanically splice two optic fibers 102a, 102b. This process is effected simply and easily using the one apparatus 100.

The restraining members 20a, 20b include slots 23 shaped to translate along and shafts 34. The restraining members 20a, 20b translate along the shafts 34 in direction $D_M$ away from an expanded splicing position to insert the cleaved end sections of the optic fibers 102a, 102b into corresponding openings 28 of the splicing channel 18, as shown in FIG. 17.

A technician can use the apparatus 100 to mechanically splice two cleaved optic fibers 102a, 102b by performing the following steps:
(a) inserting two optic fibers 102a, 102b into respective restraining members 20a, 20b;
(b) securing the optic fibers 102a, 102b in fixed positions with respect to the restraining members 20a, 20b; and
(c) moving the restraining members 20a, 20b relative to the inner section 104 from an expanded splicing position whereby end sections of optic fiber cores can be inserted into respective openings 28 of the splicing channel 18 towards the inner section 104 so that said end sections of optic fiber cores are inserted into respective openings 28 of the splicing channel 18.

The method preferably includes the step of securing the restraining members in fixed splicing positions when the end sections of the optic fiber cores are inserted in the splicing channel 18.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

LIST OF PARTS

10 Apparatus
11a, 11b Optic Fiber

12 Inner section
12a, 12b Part of inner section
14 Scoring apparatus
16a, 16b Cleaving channel
18 Splicing channel
20a, 20b Restraining member
22 End section of optic fiber core
23 Slot
24 Optic fiber core
25 Excess cleaved part
26 Cleaved end section of optic fiber core
27 Teeth
28 Opening of splicing channel
30 Actuator
32 Slot 32
34 Shaft
36 Keyed end of shaft
38 Optic fiber holding part
38a, 38b Part of optic fiber holding part
40 Locking part
42 Projection
43 Slot
44 Opening of cleaving channel
46a, 46b Fastener
48a, 48b Male and female sections of cleaving channel
50 Barrier
52 Fastener
52a, 52b Male and female parts of fastener
54 Locating projection
56 Viewing window
100 Apparatus
102a, 102b Optic fiber
104 Inner section

The invention claimed is:

1. Apparatus for mechanically splicing two optic fibers, comprising:
   (a) an inner section including a scoring apparatus, cleaving channels, and a splicing channel; and
   (b) two optic fiber restraining members, each being in operative communication with, and movable with respect to, the inner section;
   wherein the restraining members are configured to locate end sections of optic fiber cores of said optic fibers in the respective cleaving channels for scoring by said scoring apparatus; and
   wherein relative movement of the restraining members away from the inner section cleaves said end sections of the optic fiber cores; and
   wherein further relative movement between the restraining members and the inner section locates cleaved end sections of said optic fiber cores into respective openings of the splicing channel to effect mechanical splicing therebetween.

2. The apparatus claimed in claim 1, wherein the scoring apparatus includes a scoring blade coupled to an externally depressible actuator for scoring said end sections of optic fiber cores seated in the cleaving channels.

3. The apparatus claimed in claim 1, wherein the restraining members are coupled to the inner section by shafts, and said relative movement and said further relative movement is effected as the restraining members move along and/or rotate about respective shafts.

4. The apparatus claimed in claim 3, wherein the restraining members are adapted to move along the shafts away from a cleaving position, where said end sections of optic fiber cores are arranged in respective cleaving channels, to an expanded cleaving position, where cleaved end sections of said optic fiber cores are removed from the respective cleaving channels.

5. The apparatus claimed in claim 4, wherein the restraining members are adapted to rotate about the shafts from said expanded cleaving position to an expanded splicing position where said cleaved end sections of said optic fiber cores are located for insertion into corresponding openings of the splicing channel.

6. The apparatus claimed in claim 5, wherein the restraining members are adapted to move along the shafts away from said expanded splicing position to insert said cleaved end sections of said optic fiber cores into corresponding openings of the splicing channel.

7. The apparatus claimed in claim 3, wherein the shafts are keyed to limit an extent of rotation of the restraining members.

8. The apparatus claimed in claim 1, wherein the restraining members each include an optic fiber holding part and a locking part movable relative to each other between an optic fiber receiving position and an optic fiber securing position.

9. The apparatus claimed in claim 8, wherein the optic fiber holding part of each one of said restraining members is formed in two separable parts shaped to fit around lateral end section of one of said optic fibers when arranged in the optic fiber receiving position.

10. The apparatus claimed in claim 9, wherein the locking part of each one of said restraining members couples the two separable parts of the optic fiber holding part together when arranged in the optic fiber securing position.

11. The apparatus claimed in claim 10, wherein the locking part is a sleeve shaped to screw over the two separable parts of the optic fiber holding part.

12. The apparatus claimed in claim 11, wherein the optic fiber holding part of each one of said restraining members is tapered so that movement of the locking part in a direction of taper facilitates at least partial separation of the parts of the optic fiber holding part allowing insertion of an optic fiber therebetween; and movement of the locking part in an opposite direction constricts the parts of the optic fiber holding part, thereby inhibiting removal of an optic fiber arranged therebetween.

13. The apparatus claimed in claim 1, wherein the restraining members include projections through which said end sections of optic fiber cores extend, and openings of the cleaving channels are shaped to at least partially receive corresponding projections during said relative movement.

14. The apparatus claimed in claim 13, wherein the projections are tapered to assist in guidance into corresponding openings of the cleaving channels.

15. The apparatus claimed in claim 14, wherein the inner section is formed in two parts which at least partially resiliently separate as the tapered projections enter said openings of the cleaving channels during said relative movement so that the cleaving channels are open to receive said end sections of optic fiber cores.

16. The apparatus claimed in claim 15, wherein the parts of the inner section are resiliently coupled together by a fastener that resiliently tensions the end sections of optic fiber cores as the tapered projections withdraw from the openings of the cleaving channels as a result of the restraining members moving away from the inner section.

17. The apparatus claimed in claim 15, wherein excess cleaved parts of the end sections of optic fiber cores are retained in the cleaving channels after cleaving is effected.

18. The apparatus claimed in claim 1, wherein the cleaving channels include barriers defining a furthest point of insertion of said end sections of optic fiber cores.

19. The apparatus claimed in claim 1, wherein the openings of the splicing channel are chamfered to guide the cleaved end sections of said optic fiber cores into the splicing channel.

20. The apparatus claimed in claim 1, wherein the splicing channel includes index matching gel.

21. The apparatus claimed in claim 1, including fasteners for coupling the restraining members to the inner section in fixed splicing positions where the cleaved end sections of said optic fiber cores are located in the splicing channel.

22. The apparatus claimed in claim 21, wherein the fasteners include male clipping projections extending from respective restraining members and corresponding female clipping slots in the inner section.

23. The apparatus claimed in claim 1, wherein the openings of the cleaving channels are recessed and are shaped to at least partially receive corresponding locating projections extending from respective restraining members when the cleaved end sections of said optic fiber cores are inserted in the splicing channel and mechanical splicing is effected.

* * * * *